Jan. 3, 1928.  1,654,898
E. L. SCHELLENS ET AL
CENTERING DEVICE
Filed March 29, 1924   2 Sheets-Sheet 2

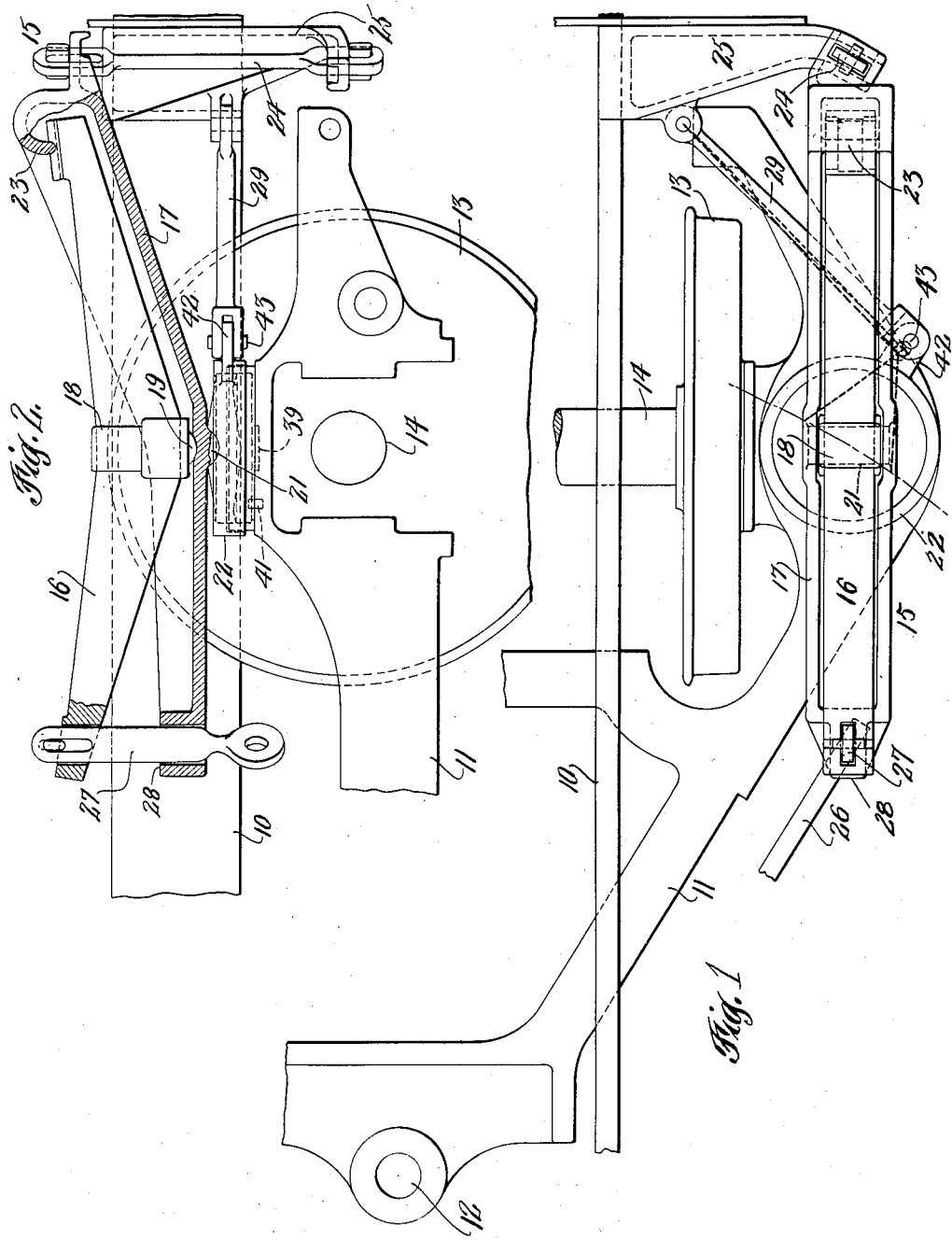

Patented Jan. 3, 1928.

1,654,898

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C. S. ENGINEERING COMPANY, A CORPORATION OF DELAWARE.

CENTERING DEVICE.

Application filed March 29, 1924. Serial No. 702,730.

Our invention relates to lateral motion resisting, centering devices for railway trucks and the like, and is especially useful for trailer trucks of locomotives. We aim to provide simple, reliable means for this purpose, that can be made compact and light, can be thoroughly lubricated, and can be effectively protected from access of injurious dirt, grit, or the like. The device comes into play when the truck swings or is displaced laterally at a curve, acting to return the truck as the locomotive runs on to tangent track again.

In the drawings, Fig. 1 is a fragmentary plan view of one side of a trailer truck and the corresponding side frame of the locomotive, illustrating the application of our centering device in one form of embodiment.

Fig. 2 is a corresponding side view, with more of the truck frame broken away than in Fig. 1, certain parts appearing partly in vertical section.

Figure 3:
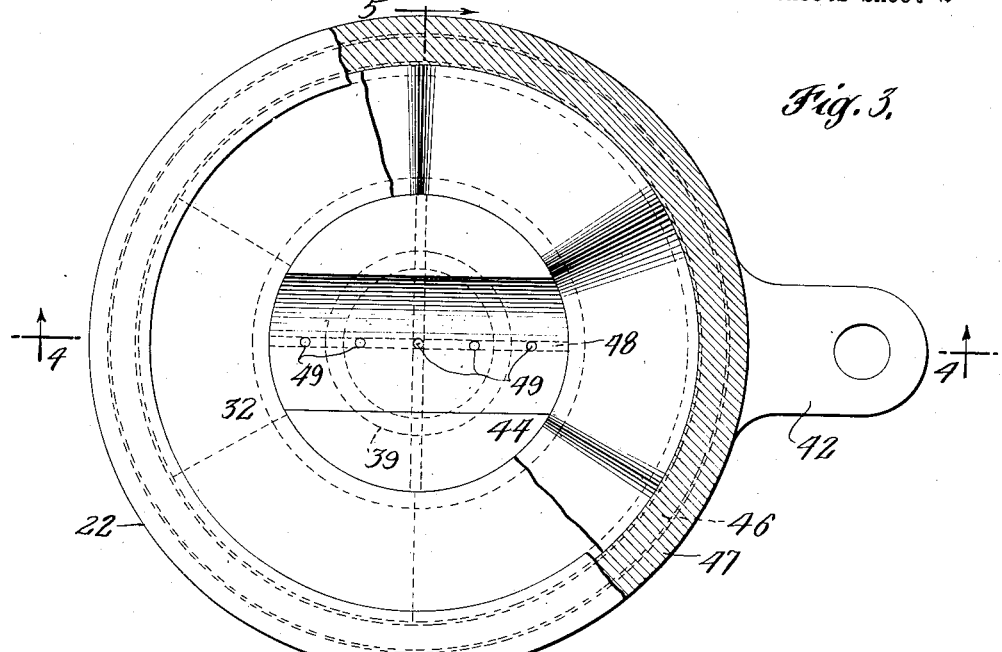
Fig. 3 is a plan view of the centering device proper, on a larger scale than Figs. 1 and 2, with portions broken away and in section.

Figs. 1 and 2 show a portion 10 of a side member of the locomotive frame, and also a portion 11 of the trailer truck frame, with the opening 12 for a pivot pin (not shown) for attaching the truck to the locomotive frame. One trailer wheel 13 and its axle 14 also appear.

The load of the vehicle weight may be transmitted to the truck by any suitable means, such as the spring rigging 15 here shown. Besides the spring 16, the rigging 15 includes a channel shaped support lever 17 interposed between the spring and the truck frame 11. The spring clip 18 has a spherical boss 19 seated in a corresponding seat in the support 17, and the support has at its lower side a corresponding transverse cylindrical bearing ridge 21 seated in a corresponding cylindrical seat on the centering device 22, which rests on the frame 11. One end of the support 17 bears on the end of the spring 16 at 23, and is connected by a link 24 to a bracket arm 25 attached to the locomotive frame member 10,—the axes of the link pivots extending radially with reference to the axis of truck frame swing at 12. The other end of the spring 16 is connected to the equalizer member 26 by a link 27 extending through a guide opening 28 in the support 17.

Thus the load of the vehicle weight is transmitted from the engine frame to the spring 16 by the parts 24, 17 at one end and by the part 27 at the other, and is transmitted by the spring 16 to the truck frame 11 through the centering device 22. However, any other suitable means may be employed for transmitting the load to the device 22.

The centering device 22 is of what may be termed a "vertical rotary" or "horizontally turning" type. As a consequence of rotation imparted when the truck swings as the locomotive takes a curve, this device 22 tends and acts to return or "recenter" the truck as soon as passage of the locomotive on to tangent track permits. This action may be effected through an actuating link connection 29 from the device 22 to the frame bracket 25. In the embodiment of our invention here shown, the returning force is the vehicle weight, which the device 22 progressively lifts a little as it turns.

Figure 4:
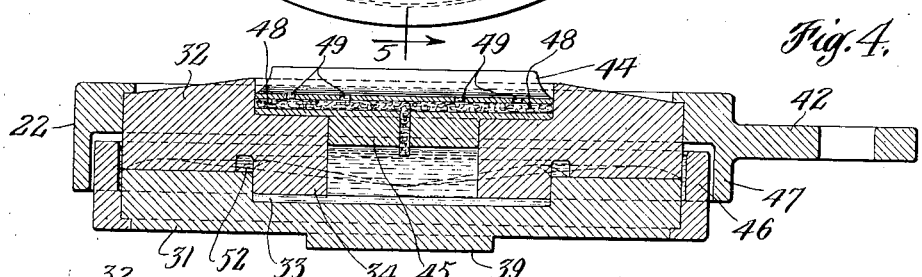
Figs. 4 and 5 show sections through the centering device, taken as indicated by the correspondingly numbered lines in Fig. 3.
Figure 5:
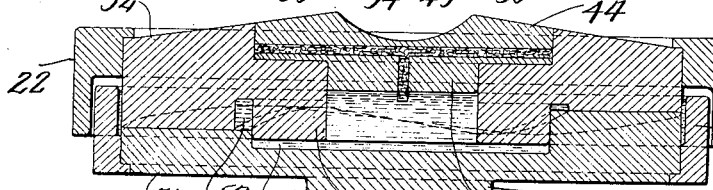
Figure 6:
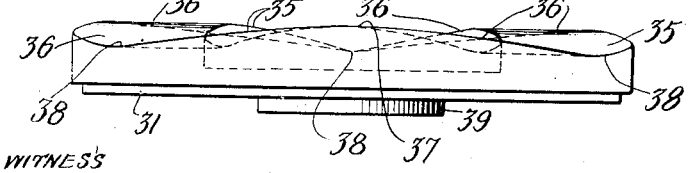
Fig. 6 is an edge view of one of the parts of the centering device.

As shown in Figs. 2 and 3–6, the device 22 here illustrated is of flat form, comprising a pair of relatively rotatable disc-like members 31, 32 with lifting means at their adjacent faces. They have central pivot means, in the form of a circular recess 33 in the lower and a corresponding boss 34 on the upper, and their lifting means extend around the pivots crown cam fashion. In the present instance, the lifting means are of inclined plane or screw form. As shown in Figs. 3 and 6, there are three pairs of oppositely pitched helical surfaces,—35, 35, 35 and 36, 36, 36,— on each of the members 31, 32, so as to give a tripod-like lift for relative rotation of these members in either direction. On the lower disc 31, the helical surfaces 35, 36 of each pair merge into a smoothly rounded crest 37 at their tops, and into rounded valleys 38, 38 between them and the surfaces 36, 35 of adjacent pairs, and vice versa on the upper disc 32. Preferably, the crown cam contours of the two parts 31, 32 are virtual counterparts of one another, and so fit together perfectly at all points under the normal running condition of the locomotive on straight track. The lower member 31 is kept in position by a central boss 39 that fits in a similar circular recess in the truck frame 11, and is kept from turning by a dowel pin 41; while the upper part has a lug or crank arm 42 to which the link 29 is pivoted at 43.

When the locomotive takes a curve and its trailer truck swings to one side or the other relative to the locomotive frame 10, the device 22 of course swings bodily with it. As a result, the link 29 causes the upper member 32 to turn on the lower one, thus lifting itself and its share of the vehicle weight by the coaction of the inclined surfaces of the two members. When, on the other hand, the locomotive runs on to straight track again, the weight on these inclined surfaces acts to rotate the part 32 in the opposite direction, so as to exert a pull or a push on the link 29 and return the truck. As shown, the seat or bearing for the fulcrum 21 of the member 17 is in a separate lateral load-receiving member 44 rotatably mounted on the upper disc member 32. This member 44 is of circular outline, and is seated in a corresponding recess in the upper side of the member 32, substantially coaxial with its pivotal boss 34. This mounting allows the bearing 44 to turn freely relative to the member 32 as the latter turns when the truck swings, thus obviating disturbance of the fulcrum ridge 21 in its seat. The bodily lateral motion of the member 17 when the truck swings is taken care of by the spring rigging 15.

As shown in Figs. 4 and 5, the pivotal boss 34 of the member 32 is hollow, and the bearing 44 has at its lower side a circular projection 45 engaged in the bore of said boss 34. The bore of the boss 34 and the bottom of the recess 33 in the member 31 afford an oil chamber or reservoir for lubricating the pivotal bearings and the circumjacent lifting means 35, 36, 37, 38. The lower member 31 has a rim 46 upstanding around its lifting means, so as to retain oil flowing out over the surfaces 35, 36, 37, 38 when the member 32 rises; in other words, the contact surfaces always work in a bath of oil. This rim 46 is formed by a collar pressed tight around the member 31. The upper member 32 has also a rim 47 externally overlapping the rim 46, and formed by a collar pressed tight around the member. These overlapping circumferential rims 46, 47 effectually exclude dirt and grit from getting between the contact surfaces of the members 31, 32 and injuring them. As shown, the actuating crank arm or lug 42 is on the upper rim 47.

Provision may be made for lubricating the rotation of the bearing 44 on the member 32 and the rocking of the fulcrum 21 on said bearing from the above described oil reservoir in the interior of the device 22, as by means of an oil duct 48 extending up through the bearing 44 and then dividing into four radial branches opening through the edges of said part 44. The duct 48 may contain wicking (as shown) for drawing up and distributing the oil, and holes 49 may be provided from two of the duct branches to the bearing surface above.

It is to be noted that the initial resistance of the device 22 to displacement of the truck is relatively high, inasmuch as the static friction at the surfaces 35, 36 is naturally higher than the friction when they move over one another in operation. This high initial resistance steadies the locomotive against swaying under momentary dynamic impulses of very short time interval.

The surfaces 35, 36, 37, 38 can advantageously be machined with a diamond point tool, and afterward scraped or ground by hand. As shown, the member 32 has an annular channel or groove 52 around its pivot boss 34, to permit proper travel of the cutting tool.

We do not here claim the spring rigging shown and described, since the same forms the subject of our pending application, Serial No. 689,931, filed Feb. 1, 1924.

We claim:

1. The combination with a railway vehicle frame and its load-transmitting means, and a truck frame, of a rotary centering device, with an axis substantially vertical, and with actuating connection to the vehicle frame for turning said device when the truck is displaced.

2. The combination with a railway vehicle frame and its load-transmitting means, and a truck frame, of a rotary centering device, with axis vertical, carried by said truck frame; an actuating connection for turning said device; and a bearing for said load-transmitting means mounted on said device with freedom for turning horizontally relatively thereto.

3. A centering device for a truck comprising relatively turning curved wedge elements loaded with and directly coacting to lift the vehicle weight when the truck is displaced, and thus tending to return the truck.

4. A rotary crown cam wedge centering device for a truck actuated to lift the vehicle weight when the truck is displaced, and thus tending to return the truck.

5. A centering device of the character described comprising relatively rotatable discs with cooperating lifting means formed on their adjacent faces.

6. A centering device of the character described comprising contacting relatively rotatable discs with pivot means, and circumjacent lateral lifting means on their contacting faces, 7. A centering device of the character described comprising relatively rotatable discs with pivot means and circumjacent lateral lifting means, and a lateral load-receiving bearing on said device rotatable coaxially with said discs.

8. A centering device of the character described comprising relatively rotatable discs with central lubricating chamber and circumjacent lateral lifting means.

9. A centering device of the character described comprising relatively rotatable discs with pivot means, a lubricating chamber, and lateral lifting means circumjacent said pivot means and chamber.

10. A centering device of the character described comprising relatively rotatable discs with hollow pivot means and lubricating means therewithin, and lateral lifting means circumjacent said pivot means.

11. A centering device of the character described comprising relatively rotatable discs with central lubricating chamber and circumjacent lateral lifting means, and a lateral load-receiving bearing on said device lubricated from said chamber.

12. A centering device of the character described comprising relatively rotatable discs with central lubricating chamber and circumjacent lateral lifting means, and a lateral load-receiving bearing pivotally engaged with said device and lubricated from said chamber.

13. A centering device of the character described comprising relatively rotatable discs with cooperating pivotal recess and boss at their adjacent faces, and circumjacent crown cam surfaces.

14. A centering device of the character described comprising relatively rotatable discs with cooperating lifting means at their adjacent faces, and overlapping circumferential dirt-excluding rims.

15. A centering device of the character described comprising relatively rotatable discs with cooperating lifting means at their adjacent faces, and a rim at the edge of one of said discs for maintaining an oil bath thereon for said lifting means.

16. A centering device of the character described comprising relatively rotatable discs with central lubricating chamber and circumjacent lateral lifting means, and overlapping oil retaining and dirt-excluding rims around said lifting means.

17. A vehicle truck centering device comprising, in combination with the vehicle frame and its weight-transmitting means, a plurality of discs between the truck and said weight-transmitting means with interengaging crown cams on their abutting faces, and a link pivotally connected to the vehicle frame and to one of said discs.

18. A vehicle truck centering device comprising, in combination with the vehicle frame and its weight-transmitting means, a plurality of discs between the truck and said weight-transmitting means with interengaging crown cams on their abutting faces, and a link pivotally connected to the vehicle frame and to the periphery of one of said discs.

In testimony whereof, we have hereunto signed our names.

E. L. SCHELLENS.
J. S. COFFIN, Jr.